(12) United States Patent
Gutelius

(10) Patent No.: US 8,393,441 B2
(45) Date of Patent: Mar. 12, 2013

(54) SPREADER SPRING

(75) Inventor: Kenneth Eric Gutelius, Lake Orion, MI (US)

(73) Assignee: Akebono Brake Corporation, Farmington Hills, MI (US)

( * ) Notice: Subject to any disclaimer, the term of this patent is extended or adjusted under 35 U.S.C. 154(b) by 195 days.

(21) Appl. No.: 13/011,971

(22) Filed: Jan. 24, 2011

(65) Prior Publication Data

US 2012/0186917 A1 Jul. 26, 2012

(51) Int. Cl.
*F16D 65/40* (2006.01)

(52) U.S. Cl. .................... 188/73.38; 188/72.3

(58) Field of Classification Search ........... 188/72.3, 188/73.36, 73.37, 73.38
See application file for complete search history.

(56) References Cited

U.S. PATENT DOCUMENTS

| | | | |
|---|---|---|---|
| 4,245,723 A | 1/1981 | Moriya | |
| 4,364,455 A | 12/1982 | Oshima | |
| 4,491,204 A | 1/1985 | Dirauf et al. | |
| 4,658,938 A | 4/1987 | Thiel et al. | |
| 4,666,025 A | 5/1987 | Rubin | |
| 4,969,540 A | 11/1990 | Cartwright et al. | |
| 5,069,313 A | 12/1991 | Kato et al. | |
| 5,249,647 A | 10/1993 | Kobayashi et al. | |
| 5,251,727 A | 10/1993 | Loeffler et al. | |
| 5,511,638 A | 4/1996 | Tsuruta | |
| 5,538,103 A | 7/1996 | Rueckert et al. | |
| 5,549,181 A * | 8/1996 | Evans | 188/72.3 |
| 5,699,882 A | 12/1997 | Ikegami et al. | |
| 5,901,815 A | 5/1999 | Kobayashi et al. | |
| 5,934,417 A | 8/1999 | Kobayashi et al. | |
| 5,941,348 A | 8/1999 | Matsumoto et al. | |
| 5,947,233 A | 9/1999 | Kobayashi et al. | |
| 6,003,642 A | 12/1999 | Mori et al. | |
| 6,286,636 B1 | 9/2001 | Iwata | |
| 6,378,665 B1 * | 4/2002 | McCormick et al. | 188/72.3 |
| 6,378,666 B1 | 4/2002 | Yoko | |
| 6,478,122 B1 | 11/2002 | Demoise et al. | |
| 6,527,090 B1 | 3/2003 | Barillot et al. | |
| D473,127 S | 4/2003 | Yoko | |
| D483,709 S | 12/2003 | Byrd | |
| 6,678,666 B1 | 1/2004 | Boulware | |

(Continued)

FOREIGN PATENT DOCUMENTS

| | | |
|---|---|---|
| EP | 2299142 A1 | 3/2011 |
| GB | 2172068 A | 9/1986 |

(Continued)

OTHER PUBLICATIONS

Co-pending U.S. Appl. No. 12/788,806, filed May 27, 2010.

(Continued)

*Primary Examiner* — Thomas J Williams

(74) *Attorney, Agent, or Firm* — The Dobrusin Law Firm, P.C.

(57) ABSTRACT

A brake assembly comprising: at least one brake spring that includes: a first arm; a second arm, the first arm and the second arm forming a first arm plane; and a body portion between and connecting to the first arm and the second arm, the body portion forming a body plane, the body plane being at an angle relative to the first arm plane; wherein the at least one brake spring is between and in communication with a pressure plate of at least two brake pads.

20 Claims, 5 Drawing Sheets

U.S. PATENT DOCUMENTS

| | | |
|---|---|---|
| 6,719,105 B1 | 4/2004 | Wemple |
| D489,655 S | 5/2004 | Byrd |
| 6,920,965 B2 | 7/2005 | Burgdorf et al. |
| 6,959,792 B2 | 11/2005 | Ashman et al. |
| 7,163,089 B2 | 1/2007 | Nogiwa |
| 7,219,773 B2 | 5/2007 | Ono |
| 7,308,974 B2 | 12/2007 | Barbosa |
| 7,455,153 B2 | 11/2008 | Ooshima et al. |
| 7,467,693 B2 | 12/2008 | Barbosa |
| 7,513,340 B2 | 4/2009 | Hendrich et al. |
| 7,644,809 B2 | 1/2010 | Cortinovis et al. |
| 7,766,131 B2 | 8/2010 | Hayashi |
| 8,020,674 B2 | 9/2011 | Miura et al. |
| 2002/0189911 A1 | 12/2002 | Layton |
| 2006/0037821 A1 | 2/2006 | Barbosa et al. |
| 2006/0070828 A1 | 4/2006 | Hendrich et al. |
| 2007/0029148 A1 | 2/2007 | Jedele |
| 2007/0251772 A1 | 11/2007 | Tsurumi |
| 2012/0205205 A1 | 8/2012 | Lethorn |

FOREIGN PATENT DOCUMENTS

| | | |
|---|---|---|
| JP | 56-21633 U | 2/1981 |
| JP | 08-261261 A | 10/1996 |
| JP | 08284983 A | 11/1996 |
| JP | 2001336554 | 12/2001 |

OTHER PUBLICATIONS

Co-pending U.S. Appl. No. 13/024,357, filed Feb. 10, 2011.

* cited by examiner

SPREADER SPRING

FIELD OF THE INVENTION

The present invention generally relates to a brake system and more particularly a spreader spring that assists in retracting brake pads.

BACKGROUND OF THE INVENTION

Typical, disc brake systems include a support bracket, two more brake pads, a caliper, and a rotor. The at least two brake pads are mounted and located adjacent to the support bracket so that the brake pads move axially towards and away from the rotor. The disc brake system may include a pad clip that attaches to the support bracket and to a portion of the one or more brake pads so that the brake pads are held in the support bracket. The disc brake system may include one or more springs that attach to the brake pads to assist in retracting the brake pads. The addition of one or more clips and/or one or more springs may require modifications to be made to the support bracket, brake pads, caliper body, or a combination thereof so that the spring and/or pad clip may be used. In addition these springs may not be used with existing braking systems because the spring does not fit without the modifications discussed above. Examples of springs and pad retraction devices are disclosed in U.S. Pat. Nos. 5,249,647; 5,511,638; 6,378,665; 7,308,974; and 7,467,693; U.S. Patent Application Publication No. 2002/0189911; U.S. patent application Ser. No. 12/788,806; and Japanese Patent No. 56021633U all of which are expressly incorporated herein by reference for all purposes.

One problem faced by these springs is that they work with "new" brake designs, or brakes modified specifically for each design. These springs may not easily be added to existing systems when the brakes are changed so that the benefits of the spreader spring can be seen with used vehicles. These springs may require special pad clips, brake pads, pressure plates, support brackets, caliper housings, or other additional features so that the spreader spring is held in place.

Another problem faced by known springs is that they require holes to be drilled in the pressure plate of a brake pad, which makes each brake pad more expensive and time consuming to produce. Thus, a spreader spring may not be added to this braking system without adding a brake pad with a specific design.

Yet another problem of know springs is that some of the springs are "over the rotor" designs (i.e. the spring is placed directly over the rotor) and are subject to interference with moving parts such as the rotor or the wheel. For example, the spreader spring may contact the rotor, the caliper housing, or both and move out of contact with the brake pads, become damaged, or become tangled within other parts causing damage to the other parts such as the rotor, brake pads, fluid lines, tires, or a combination thereof. The over the rotor designs may require additional clips and/or support structures so that the spring does not contact other parts of the braking system, thus, adding expense to the brake system and preventing the spreader spring from being added to existing systems easily. Some over the rotor designs may require the caliper housing to be redesigned so that there is enough space for the spring to fit under the caliper housing.

Another such problem faced by known disk brake systems is lateral run out (LRO) and disk thickness variation (DTV). Each rotor will exhibit some LRO as the rotor rotates, and each rotor will have some variation in disk thickness. As the rotor moves the rotor may contact the brake pads at a high spot on the disk due to DVT, the rotor may contact the brake pads due to LRO, or both. After repeated contact with the brake pads a thin spot may be created in the disk, and this thin spot may further increase the variation in thickness across the disk otherwise known as "DVT growth." As a result of DVT growth the driver may perceive an increase in torque and pressure via pedal pulsation, steering wheel shake or "nibble," vibration of the vehicle, or a combination thereof. Thus, there is a need for a device that can be incorporated into known braking systems, which minimizes and/or eliminates DVT growth so that noise, vibration, & harshness (NVH) are reduced and/or eliminated. Thus, there is a need for a spreader spring that is light, strong, resistant to failure, and can be added into existing braking system without any modifications to the braking system and/or the spreader spring, or using other additional parts.

SUMMARY OF THE INVENTION

The present invention meets this need by providing a solution in the form of a brake spring. The brake spring may be located on one or both ends of brake pads. Further, the brake springs may be used in conjunction with pad clips.

One possible embodiment of the present invention includes a brake assembly comprising: at least one brake spring that includes: a first arm with at least two arcuate portions, a second arm with at least two arcuate portions, and a body portion between and connected to the first arm and the second arm; wherein at least one brake spring is in communication with a pressure plate of at least one brake pad.

A possible embodiment of the present invention includes a brake assembly comprising: at least one brake spring that includes: a first arm; a second arm, the first arm and the second arm forming a first arm plane; and a body portion between and connecting to the first arm and the second arm, the body portion forming a body plane, the body plane being at an angle relative to the first arm plane; wherein the at least one brake spring is between and in communication with a pressure plate of at least two brake pads.

Another possible embodiment of the present invention includes a brake assembly kit comprising: one or more brake pad; at least one pad clip; at least one brake spring that includes: a body portion; a first arm with at least two arcuate portions connected to the body portion, and a second arm with at least two arcuate portions connected to the body portion; wherein the at least one brake spring is configured to be placed within the at least one pad clip so that the pad clip holds the brake spring.

One possible method of using the present invention includes replacing brake pads comprising: removing worn brake pads a brake assembly; placing new brake pads in the brake assembly; attaching a pad clip to a support bracket of a brake assembly; placing a brake spring in the brake assembly wherein the brake spring includes: a body portion that extends though a gap in the pad clip; a contact point located at the end of each arm of the brake spring that contacts a pressure plate of each of the brake pads; and an arcuate portion on each arm that is substantially surrounded by the pad clip.

Another possible method of using the present invention includes reducing drag in a brake assembly comprising; compressing a brake spring; and placing the brake spring between ends of a pair of brake pads; wherein the brake spring includes: a first arm with at least two arcuate portions, a second arm with at least two arcuate portions, a body portion between and connected to the first arm and the second arm; and a contact point at the end of first arm and the second arm that contact the pair of brake pads; wherein the contact points each contact a different brake pad and assist in moving the brake pads in the retract direction.

One unique aspect of the present invention envisions a spreader spring that can be incorporated into existing braking systems without the need for any modifications to the braking system, additional parts, adding expense, labor, or a combination thereof to the braking systems. The present invention does not require any additional holes and/or coupling areas in which contact with the pressure plates of the brake pads is made so that the spreader spring may assist in retracting the brake pads, thus, the present invention may be used with a significant number of existing brake pad designs. Further, the present invention fits outside of the caliper housing and extends laterally away from the caliper housing and brake rotor so that the spreader spring may be used regardless of the caliper housing employed by the braking system.

Another unique aspect of the present invention envisions a spreader spring that may be used with a significant number of pad clips and or braking systems. The spreader spring may be incorporated around portions of and/or into portions of the pad clips so that vertical displacement (e.g., movement perpendicular to the face of the support bracket) of the spreader spring is minimized. The spreader spring may further extend through and/or around portions of the pad clip so that a portion of the spreader spring is in close proximity to and/or in contact with the support bracket so that movement is minimized and/or eliminated.

Still another unique aspect of the present invention assists in retraction of the brake pads and maximizes air gap of the disk brake system. The present invention maximizes the air gap between the brake pads and the rotor, which minimizes or even eliminates unwanted contact of the rotor and brake pads during non-braking vehicle operation and, thus, minimizes or eliminates DVT growth without creating a long petal travel or causing the brake pads to feel soft to the user. By minimizing DVT growth the present invention further prevents noise, vibration, & harshness issues from developing. Therefore, the present inventor has identified that the present invention may be employed in existing braking systems so that the present invention will improve brake pad life, rotor life, and fuel efficiency due to reduced brake drag.

DETAILED DESCRIPTION OF THE INVENTION

Figure 1:
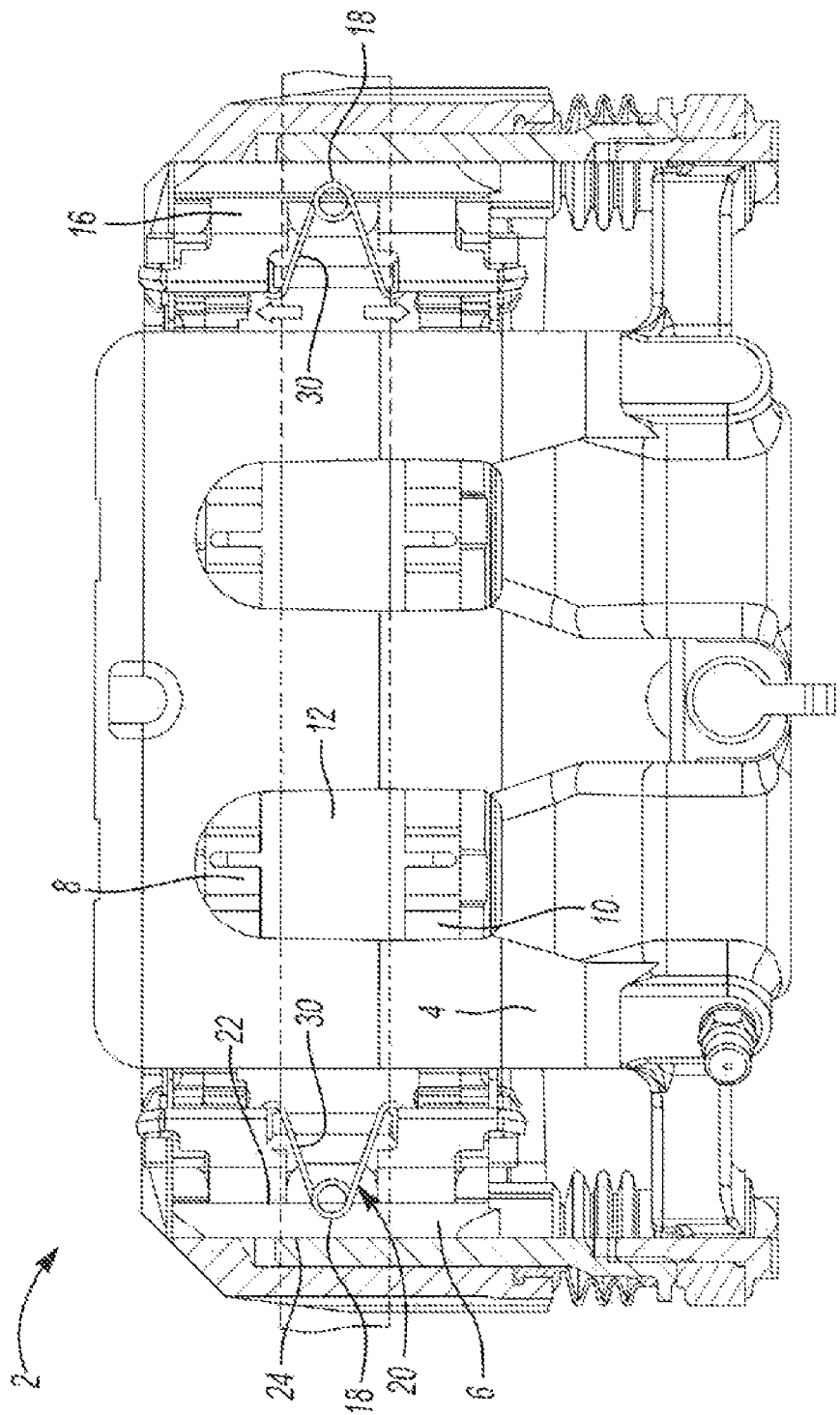
FIG. 1 illustrates one embodiment of the present invention with a brake caliper.

The following description of the preferred embodiment(s) is merely exemplary in nature and is in no way intended to limit the invention, its application, or uses.

The present invention is predicated upon providing an improved spreader spring for use with a brake assembly in vehicles. For example, the spreader spring may be used with almost any brake assembly and the brake assembly may be used with almost any vehicle (e.g. car, truck, bus, train, airplane, or the like). Alternatively, the spreader spring and brake assembly may be integrated into components used for manufacturing or other equipment that require a brake such as a lathe, winder for paper products or cloth, amusement park rides, or the like. However, the present invention is most suitable for use with a passenger vehicle (i.e. a car, truck, sports utility vehicle, or the like).

Generally, a disc brake assembly includes a caliper body, a rotor, and two brake pads. The caliper body is in communication with an inboard brake pad and an outboard brake pad that are on opposing sides of the rotor. The brake pads may be held in communication with a support bracket of the caliper body by a pad clip. A pad clip may be placed at one end of the brake pads. Preferably, when pad clips are used one pad clip is used at each end of the brake pads so that the brake pads are maintained in communication with the support bracket. The present invention may include a spreader spring at one end of the brake pads. Preferably, the present invention includes a spreader spring (i.e. brake spring) at each end of the brake pads and each spreader spring is used in conjunction with a pad clip so that the spreader spring will assist the brake pads in retracting after a brake apply.

The spreader spring includes a body portion. The body portion may be arcuate. Preferably, the body portion may be generally straight. More preferably, the body portion may be substantially straight but may include one or arcs so that the body portion may be one unitary piece. For example, the body portion may be generally straight but include a plurality of arcuate sections that are in combination so as to create one or more continuous arcuate portions that combine to create a part of the the body portion. The body portion may include a loop. The body portion may include a serpentine configuration. The body portion may extend away from the rotor. The arms of the spreader spring may be closer to the rotor than the body portion. Preferably, the spreader spring does not extend directly over the rotor. More preferably, if the body portion extends over the rotor the body portion extends indirectly over the rotor. For example, the body portion of the spring may be separated from the rotor by at least a portion of the support bracket, the pad clip, or both (i.e. all or a portion of the spreader spring may indirectly extend over the rotor). For example, the spreader spring is located at an end of the brake pad and the body portion extends away from and around the outer circumference of the rotor so that the spreader spring contacts both brake pads simultaneously without directly extending over the rotor. The spreader spring may be located so that all or a portion of the spreader spring does not extend either directly or indirectly over the rotor. The spreader spring may be free of contact with a central portion of a pressure plate of a brake pad (i.e. any portion of the brake pad that contacts the rotor). The body portion may have multiple points that are located equally far from the rotor. Preferably, the body portion may have one point that is located furthest from the rotor (i.e. a distal end).

The body portion may include a section that stores energy. The energy storage portion may be at any point on the body portion, the arm portions, the arcuate portions, or a combination thereof. The energy storage portion may be any configuration that is compressed and/or bent so that upon release the compression and bending may be used to move the brake pads in the retract direction. The energy storage portion may be arcuate. The energy storage portion may an additional piece of the spreader spring. Preferably, the energy storage portion may be a unitary part of the spring. The energy storage portion may be made of any material that assists in retracting brake pads. The energy storage portion may be any configuration that assists in retracting the brake pads. For example, the energy storage portion may be a "V" shape, an "S" shape, a loop, a triangle, a circle, a square, an elastomeric piece that is compressed, an arcuate portion in the body portion, an arcuate portion in the arms, or a combination thereof. The energy storage portion may include a plurality of arcs. Preferably, the energy storage portion may be located at a central location on the body portion between the arms of the spreader spring. More preferably, the energy storage portion may be located at the distal end of the body portion.

The body portion may form a plane (i.e. the body plane). The body portion may form a plane and the arms may form a different plane or different planes. For example, the body plane may end when a new plane begins (i.e. the arms curve and begin a new plane). The entire body portion may be in the body plane. The body may form and be located in more than one plane. For example, the body portion may include a section that is arcuate and forms a second body plane separate from the first body plane. The second body plane may be parallel to the first body plane. The second body plane may be perpendicular to the first body plane. Preferably, the body portion may only form one plane.

The body portion may have a length. The length of the body portion is measured from a distal end of the body portion to an opposite end of the body portion where the body portion terminates and the arms are formed. For example, the body measures from the tip of the body (i.e. the distal end) to the end of the body (i.e. the point where an arcuate portion curves out of the body plane forming the arms). The body portion may begin at an angle that turns off of the arms, into the body plane, and end at a distal portion. The angle may be any angle that curves the body portion towards the support bracket and away from the wheel, the rotor, moving parts, or a combination thereof so that the body portion is free of contact from the wheel, rotor, moving parts, or a combination thereof. The length of the body portion may be constant (i.e. the length does not change when the spring is in the brake apply position, the brake retract position, or any position therebetween). The length of the body portion may change. For example, the body portion may become longer as the brakes are applied. The body portion may be shortest when the brakes are in the retract position (i.e. when the brake pads are not in contact with the rotor, are at the maximum running clearance, maximum air gap position, or a combination thereof). The body portion may be longest when the brakes are in the apply position (i.e. the brake pads have been moved into contact with the rotor). The length of the body potion may be directly proportional to the angle between the two arms. For example, as the angle becomes smaller the length of the body portion may increase. The length of the body portion may elongate substantially tangentally to the outside circumference of the rotor. For example, during a brake apply the spreader spring may become longer and the distal end of the spreader spring may become further from the rotor (i.e. extend tangentially away from the circumference of the rotor).

The body portion may contact the support bracket when the brake pads are in the retracted position (i.e. the brake pads are away from the rotor and little or no force is being applied to the brakes). The body portion may contact the support bracket when the brake pads are in the apply position (i.e. the brake pads are in contact with the rotor). Preferably, the length of the body portion when the spring is in the retract position is long enough that at least a part of the body portion (i.e., a distal portion) of the spring laterally extends over at least a portion the support bracket (i.e. the end of the clip furthest from the rotor is at least substantially adjacent to the inner edge of the support bracket). Preferably, the length of the body portion when the spring is in the fully applied position is short enough that the body portion (i.e., a distal portion) of the spring does not extend laterally past the outer edge of the support bracket. The body portion may contact the support bracket when the brake pads are at any position between a retracted position and an apply position. Preferably, the body portion will be free of contact with the support bracket in the apply position, the retract position, or any position therebetween. More preferably the body portion may extend over the support bracket and be substantially free of contact with the support bracket in all positions. However, the body portion may periodically contact the support bracket so that the spreader spring maintains a compact alignment and does not rotate out of position. The support bracket may restrict rotation of the body portion of the spreader spring so that the spreader spring does not rotate and contact moving portions of the brake assembly. The body portion may be centrally located between arm portions. Preferably, the body portion may be located between two arm portions.

The arm portions may be straight. The arm portions may be arcuate. Preferably, the arm portions may include at least two arcuate portions. However, each arm portion may include three, four, five, six, or even seven arcs formed in conjunction to create the arm portion as described herein. The arm portions may include a generally serpentine configuration. The arms may include one or more U-shaped portions. Preferably, the arms include at least two U shaped portions. The U-shaped portions may be located juxtaposed to each other. The U-shaped portions may face in opposite directions. The U-shaped portions may share a common wall. The shape of the arms may be any shape that allows the spreader spring to assist in retracting the brake pads. Preferably, the shape of the arms may be any shape that allows the spreader spring to contact the brake pads without contacting moving parts of the brake assembly. More preferably, the shape of the arms of may be any shape that allows movement (i.e. vertical, horizontal, diagonal, rotational, or a combination thereof) of the spreader spring to be minimized so that the spreader spring remains in place and assist in moving the brake pads. The arm portions may be long enough so that they contact the brake pads and assist in retracting the brake pads. The entire length of each arm may be coplanar. The arms may form one or more arm planes (i.e., a first arm plane, a second arm plane, or more). Preferably, as the arm portions extend from the body portion at least one of the arcs of each arm curve out of the plane of the body, the first arm plane, or both so that the arm portion creates a second arm plane adjacent to the plane of the body portion, the first arm plane, the body portion, the arm portions, or a combination thereof. The arm portions may have multiple planes. The arm portions may have two, three, four, five, or even six planes. Preferably, the arm portions have at least two planes. The arm portions may include one or more arcuate curves that curve the arm portions up or down relative to the body portion, the arm portion closest to the body portion, or both. The arms may be coplanar with the body portion. Preferably, the arms may substantially be in a different plane than the body portion. The arms may be substantially mirror images of each other.

The arms may be at an angle relative to the body or vice versa. There may be an angle between a first plane and a second plane (e.g. between the arms and the body or a first portion of the arms and a second portion of the arms). The angle between the arms and the body may be any angle that holds the spreader spring in place and allows the spreader spring to assist in moving the brake pads in the retract direction. The angle between the arms and the body portion may be about 5 degrees or greater, about 10 degrees or greater, preferably about 15 degrees or greater, or more preferably about 20 degrees or greater. The angle between the arms and the body portion may be about 45 degrees or less, about 40 degrees or less, preferably about 35 degrees or less, more preferably about 30 degrees or less, or most preferably about 25 degrees or less (i.e. about 22 degrees).

The arms may be separated by an angle. The angle may be any angle that allows each arm to contact a brake pad. Preferably, the angle between the arms allows each arm to contact a different brake pad. The angle between the arms may vary depending on the condition of the brake pads. For example, if the brake pads are new the angle may be larger. If the brake pads are fully worn the angle between the two arms may be smaller. Thus, as the brake pads wear and the spreader spring deforms the angle between the arms may change. The angle between the arms may be any angle that allows the spreader spring to contact the brake pads and assist in moving the brake pads. The angle between the arms may be about 150 degrees or less, about 135 degrees or less, preferably about 115 degrees or less, or more preferably about 90 degrees or less. The angle between the arms may be about 15 degrees or more, about 25 degrees or more, preferably about 40 degrees or more, or more preferably about 60 degrees or more (i.e. about 67 degrees). The angle between the two arms may change (i.e. deform) by about 1 degree or more, about 3 degrees or more, about 5 degrees or more, or even about 7 degrees or more as the brake pads wear. The angle between the two arms may change (i.e. deform) by about 15 degrees or less, about 12 degrees or less, about 10 degrees or less, or about 8 degrees or less. Thus, for example, if the spreader spring has an angle between the arms of about 55 degrees when employed with new brake pads the angle may be about 48 degrees when the brake pads are fully worn (i.e., the angle changed about 7 degrees). The arm portions may extend out from the body portion and then form a finger portion that terminates at a contact point.

The finger portion may form its own plane. Preferably, the finger portion may be part of the second arm plane. The finger portion may be the point of contact for the spreader spring (i.e. the length of the finger may be used to hold the spreader spring in place). Preferably, the finger portion may include a contact point at and end of the finger. The finger portion may form an angle relative to the portion of the arm to which it connects. The angle between the arm portion and the finger portion may be any angle so that the contact point of the finger holds the spreader spring in place and the spreader spring assists in retracting the brake pads. The angle between the arm portions and the finger portions may be about 30 degrees or greater, about 45 degrees or greater, preferably about 60 degrees or greater, or more preferably about 75 degrees or greater. The angle between the arm portions and the finger portion may be about 150 degrees or less, about 135 degrees or less, preferably about 120 degrees or less, or more preferably about 105 degrees or less. Most preferably, the angle between the arm portions and the finger portions may be a right angle.

The contact point may be any location where the spreader spring contacts the pressure plate of the brake pad. The contact point may be a single point on each arm of the spring (e.g. a cross-sectional end of the spring material). Preferably, each arm has one contact point. More preferably, each spring has at least two arms and each arm has at least one contact point. Even more preferably, each spring is located between at least two brake pads and at least one contact point of the brake spring contacts the pressure plate of each of the brake pads. For example, a contact point of a first arm contacts one pressure plate and a contact point of a second arm contacts a different pressure plate. Most preferably, there are at least two springs in contact with the two brake pad and the brake springs are located at opposite ends of the brake pads. The contact point may be a length of the spreader spring (e.g. the spreader spring may curve and form a finger off of the arms so that the entire length of the finger in contact with the pressure plate). The contact point may contact a pressure plate of a brake pad. The contact point may contact an end of the pressure plate (i.e. an ear of the brake pad). Preferably, the contact point may contact a semi-pierced hole (i.e. a punched hole, a cast hole, stamped slot, notch, indentation, or the like) of the contact plate. More preferably, the contact point is free of contact with drilled holes in the pressure plate.

The arms may include a section that stores energy. The energy storage portion may be at any point on the arms. The energy storage portion may be any configuration so that the spring is compressed and bent and the compression and bending (i.e. the angle between the arms are changed relative to one another) may be used to move the brake pads in the retract direction. The energy storage portion of the arms may use any of the features discussed herein to describe the energy storage portion of the body portion.

The spreader spring may be used in conjunction with a pad clip. The pad clip may be attached to a support bracket of a brake system. The pad clip may have one or more legs. Preferably, the pad clip has at least two legs. The pad clip may include a leg on each end of a bridge portion that connects the legs. The bridge portion may extend over a gap, under a gap, or both. The legs may include a portion below the bridge, a portion coplanar with the bridge, a portion above the bridge, or a combination thereof. The legs of the pad clip may substantially conform to the shape of the support bracket so that the pad clip attaches to the support bracket. For example, the legs of the pad clip may have a portion that protrudes out (i.e. a protrusion portion) in the center of the legs so that the pad clip is shaped substantially similar to the support bracket so that the pad clip may be attached to the abutment of the support bracket. The legs, in addition to a portion that protrudes out, may include a recessed portion. For example, the recessed portion may be formed by the bridge and the protrusion being parallel so that a "C" or "U" shaped recess is formed between the protrusion and the bridge. The legs may include a recess above the bridge, a recess below the bridge, or both. The bridge portion of the pad clip may include a gap (i.e. a portion of the clip that is free of material and is substantially surrounded by the bridge and the legs). The rotor may pass through a gap in the pad clip; preferably a gap below the bridge. The body portion of the spreader spring may extend through the gap in the pad clip; preferably a gap above the bridge. More preferably, the spreader spring may extend through the gap of the pad clip so that the body portion of the spreader spring is in close proximity to the support bracket. The body of the spreader spring may extend through the gap and the arms of the spreader spring may substantially align with corresponding portions of each leg of the pad clip so that the pad clip minimizes vertical displacement of the spreader spring. For example, the arcuate portions of the arms of the spreader spring may fit in the recessed portion above the protrusion and the bridge. The recessed portion of the pad clip may substantially surround one or more arms, the body portion, or a combination thereof of the spreader spring. Most preferably, the body of the spreader spring may be substantially free of contact with the pad clip, the support bracket, or both so that the arms of the spreader spring act dependently upon each other. For example, during a brake retract the arms exert substantially the same amount of force in the retract direction because the arms are interconnected to each other without any external factors effecting the distribution of force.

The pad clip may not attach to the spreader spring. For example, the pad clip does not have any additional pieces that grip, hold, guide, the like, or a combination thereof either temporarily or permanently to the spreader spring. The spreader spring may held in the pad clip by only its attachment to the brake pads. Preferably, the pad clip is free of a spring assembly support (e.g. a tubular support, lug, protrusion, hook, locator, restraint, the like, or any combination thereof).

The recessed portion may contact and assist in retaining the arcuate portions of the arms so that the spreader spring is held in place and is not vertically displaced. The recessed portion may be substantially free of contact with the arms of the spreader spring when the spreader spring is in the fully retracted position (i.e. when the brakes are retracted and at rest). The arcuate portions of the spreader spring may contact the recessed portion of the pad clip during a brake apply so that the spreader spring remains in substantially one plane. For example, as the brakes are compressed the body portion of the spreader spring may move further through the gap in the pad clip and the braking forces on the spring may move the body portion of the clip vertically, in relationship to the support bracket, and the arcuate portions of the arms may contact the pad clip so that vertical displacement of the spring is stopped. The recessed portion of the pad clip may substantially prevent the spreader spring from moving vertically away from the support bracket (i.e. up), and the support bracket may prevent the spreader spring from moving vertically in the direction of the support bracket (i.e. down). The spreader spring (i.e. body portions, the first arm, the second arm, or a combination thereof) may remain substantially in the same plane during a brake apply, a brake release, or any position in-between. The spreader spring may be substantially free of contact with the pad clip (i.e. body portion, gap, recess, protrusions, legs, or a combination thereof) during a brake apply, a brake release, or any position in-between.

The spreader spring may move in a plane as the spring is compressed and/or bent during a brake apply. The plane of movement may be substantially parallel to the support bracket. The plane of movement may be in the same plane as the body plane or one of the arm planes. The movement of the spring may begin in one plane and move into another plane. For example, the spring may begin moving in the body plane and as the spring is compressed the spring moves vertically into the arm plane, or vice versa until the spreader spring contacts the pad clip, the support bracket, or both.

The spreader spring may deform as the brake pads wear. The deformation may be elastic deformation. For example, the shape of the spreader spring does not permanently change as the brake pads wear, but the spreader spring elastically deforms so that the spreader spring remains between the two brake pads, and assists in returning the brake pad substantially back to their pre-brake position so that a constant air gap is maintained. Air gap may be the total distance between the face of the inboard brake pad and the face of the outboard brake pad minus the thickness of the rotor, when the inboard brake pad contacts the piston and the outboard brake pad contacts the fingers. To state it another way, air gap may be the distance between the face of the rotor on the outboard side and the face of the outboard brake pad when the inboard brake pad is pushed into contact with the face of the rotor on the inboard side and when the inboard brake pad contacts the piston and the outboard brake pad contacts the fingers. The air gap may be any size that allows for braking. The air gap may be of any size that does not cause the brake pedal to have a soft feel or a long travel. Preferably, the air gap will be small (e.g. between about 0.05 mm to about 0.2 mm). Preferably, the deformation may be plastic deformation. For example, as the brake pads wear the spreader spring will change shape so that the distance between the two arms, the two contact points, or both becomes smaller. In another example, as the spreader spring plastically deforms the force exerted against each brake pad will remain substantially constant.

The spreader spring may be compressed or bent when the spreader spring is placed between the brake pads. For example, the spreader spring may be squeezed so that the spreader spring is placed between the two brake pads, and the spring will exert a force pushing against the brake pads. Thus, even when the brake pads are in the fully retracted position the spreader spring is exerting some force against the brake pads. The amount of compression that the spreader spring is under may vary as the brakes are applied and retracted. The spreader spring may apply a liner amount of force on the brake pads as the spreader spring moves the brake pads. The amount of force the spreader spring applies against the brakes may be a non-linear amount of force. For example, as the brakes are applied and the gap between the arms of the spreader spring decreases the amount of compressive force the spring is under may increase in an exponential manner. Thus, the amount of force the spreader spring applies to the brake pads will be greatest when the brake pads are in the fully applied position. The amount of force applied by the spreader spring may be about 10 percent greater, about 20 percent greater, about 30 percent greater, or even 40 percent greater when fully compressed (i.e. the brakes are in contact with the rotor) versus fully retracted (i.e. the brakes are at maximum air gap).

The spreader spring may exert a force axially, in relationship to the rotor, in the retract direction. The spreader spring may apply any amount of force that assists the brake pads in moving axially, relative to the rotor, after a brake apply. Each arm of the spreader spring may assert a different force on each of the respective brake pads. Preferably, the arms of the spreader spring may exert substantially the same force on each of the respective brake pads. The one or more arms may each exert an axial force in the retract direction of about 5 N or more, about 10 N or more, about 15 N or more, about 20 N or more, about 25 N or more, or even about 30 N or more. The one or more arms may each exert an axial force in the retract direction of about 50 N or less, about 45 N or less, about 40 N or less, or even about 35 N or less. Preferably, two spreader springs are used (i.e. one on each side of the brake pads). More preferably, both spreader springs may exert an axial force in the retract direction; for example, one spreader spring may exert a force of about 20 N and two spreader springs may exert a force of about 40 N on each brake pad. Two spreader springs may exert a force of about 10 N or more, about 20 N or more, about 30 N or more, about 40 N or more, about 50 N or more, or even about 60 N or more. Two spreader springs may exert a force of about 100 N or less, about 90 N or less, about 80 N or less, or about 70 N or less. Preferably, the brake may include an inboard brake pad and an outboard brake pad and the one or more spreader spring will apply substantially the same amount of force to both brake pads in the retract direction.

The spreader spring may be made of any material that may be formed and may exert a force when compressed. The spreader spring may be made of and/or include polymeric materials. The spring may be made of plastic. The spreader spring may be made of multiple materials. For example, a portion of the spring may be metal and another portion may be a polymeric material such as rubber. Preferably, the spring may be made of metal. The spring may be any metal that exhibits good plastic deformation and good elastic deformation characteristics. More preferably, the spring may be made of stainless steel. The spreader spring may be made of a wire, a sheet, a band, tube, pipe, or the like. Preferably, the spring is made of wire. The material may be any gauge that assists in moving the brake pads in the retract direction. The material may be any size that allows the spreader spring to exert a desired force. The material may be any size (e.g. thickness, diameter, gauge, length, width, or the like) that allows the spreader spring to assist in pad retraction. The wire may be about 0 gauge or larger, about 3 gauge or larger, about 5 gauge or larger, or about 10 gauge or larger. The wire may be about 30 gauge or smaller, about 25 gauge or smaller, or about 20 gauge or smaller (e.g., between about 22 gauge and about 12 gauge (i.e., about 18 gauge when measured using the steel wire gauge scale)).

The spreader spring may be included in brakes from the manufacturer. The spreader spring may be added to a used car when the brakes are changed. A pair of spreader springs may be included with a set of new brakes so that when the brake pads are changed the spreader springs may be installed.

The spreader spring may be included in a kit. The kit may include one or more and preferably two of the following components: brake pads, spreader springs, and pad clips. It is contemplated that other components may be included in the kit. The kit may be used to replace worn brake pads on a vehicle.

A method of improving fuel efficiency of a vehicle includes a step of adding the spreader spring discussed herein into a brake system. The spreader spring may be added by compressing the spreader spring so that the spreader spring fits between the two brake pads. The compressed spreader spring may be released so that the spreader spring simultaneously contacts both brake pads. The spreader spring may be aligned with semi-pierced holes in the pressure pads either during the step of compressing the brake pads or after the brake pads are released. The contact points of the spreader spring may be placed in the semi-pierced holes of the pressure pads. The method may also include any step that is required to change the brake pads.

FIG. 1 of the present invention shows a top view of one possible brake assembly 2 that may be used with the present invention. The brake assembly includes a caliper housing 4, a support bracket 6, an outboard brake pad 8, an inboard brake pad 10, a rotor 12, a spreader spring 30, and a pad clip 16. The spreader spring 30 is used in conjunction with the pad clip 16 and extends though a gap 20 in the pad clip 16. The distal end 18 of the spreader spring 30 extends over an inside edge 22 of the support bracket 6 when the brakes are in the retracted position. The distal end 18 of the spreader spring 30 does not extend past an outside edge 24 of the support bracket when the brakes are in the apply position. FIG. 1 has arrows that illustrate movement of the brake pads in the retract direction.

Figure 2:
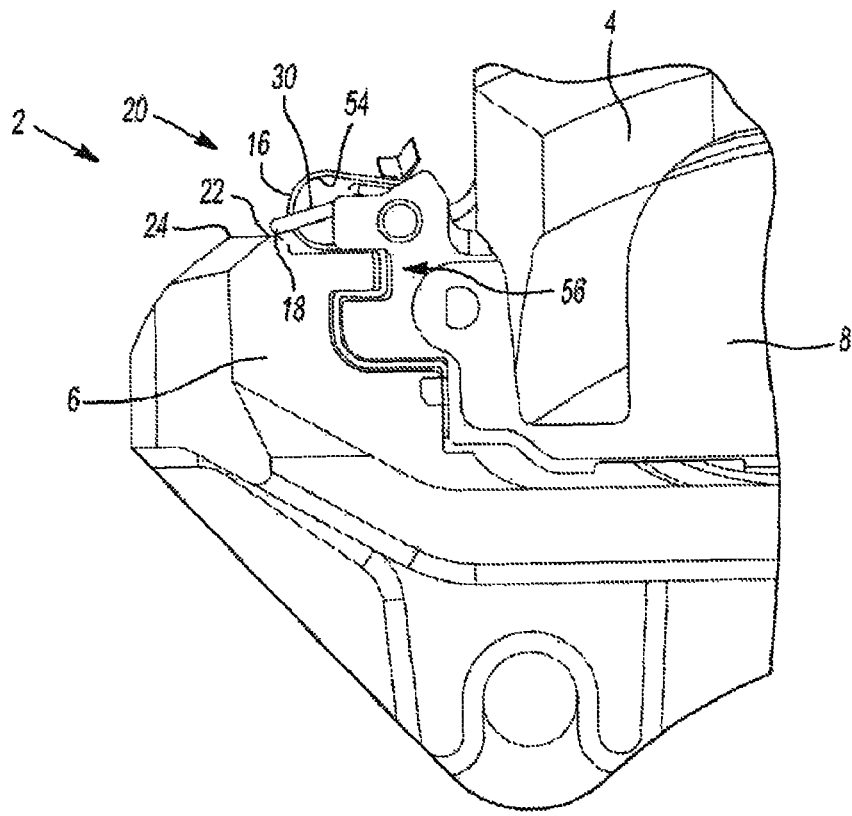
FIG. 2 illustrates a side view of one embodiment of the present invention with a brake caliper.

FIG. 2 of the present invention shows a side view of the brake assembly 2 of FIG. 1 from the outboard side of the brake assembly. The caliper housing 4 extends around the outboard brake pad 8 so that during a brake apply the caliper housing 4 can move the outboard brake pad 8. The caliper housing is movingly attached to the support bracket 6. The pad clip 16 is attached to the support bracket 6 and substantially mirrors at least a portion of the support bracket 6. The spreader spring extends through a gap 20 in the pad clip 16 so that the distal end 18 of the spreader spring 30 extends between the inside edge 22 and the outside edge 24 of the support bracket during a brake apply, a brake retract, or any movement therebetween. The pad clip 16 includes a recess 54 that assists in restraining vertical movement of the pad clip 16 and a protrusion 56 that assists in holding the pad clip 16 to the support bracket 6.

Figure 3:
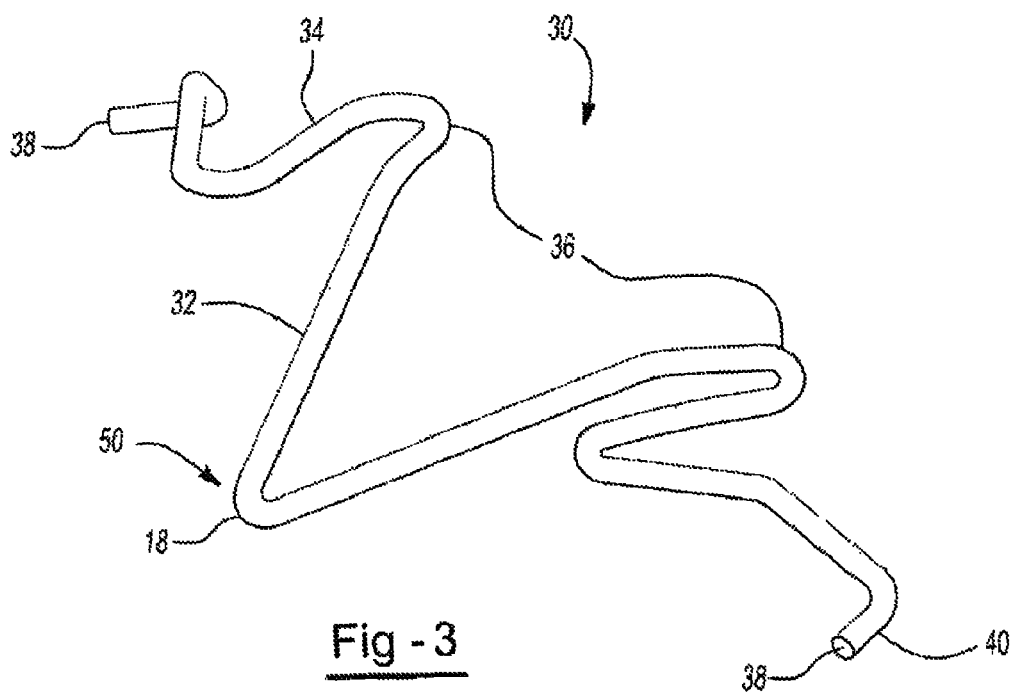
FIG. 3 illustrates a side elevational view of one embodiment of the present invention.

FIG. 3 illustrates one embodiment of the present invention. The spreader spring 30 includes a body portion 32, one or more arms 34, one or more arcuate portions 36, and one or more contact points 38. Each arm 34 may further include a finger 40 and a contact point 38 at the end of each finger 40. The spreader spring 30 further includes an energy storage portion 50 at the distal end 18 of the spreader spring. The energy storage portion 50 retains energy when the spreader spring 30 is compressed.

Figures 4A, 4B:
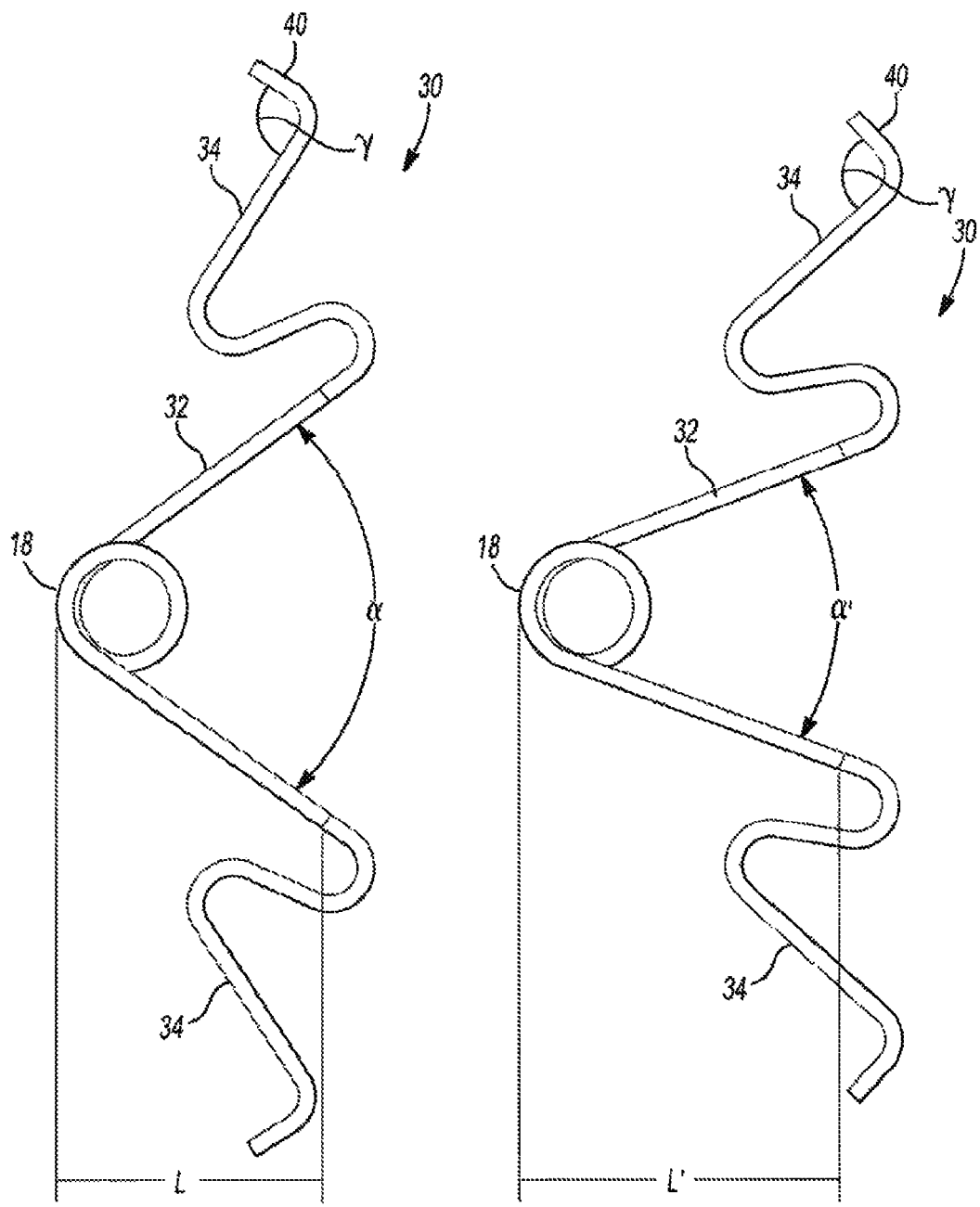
FIG. 4A illustrates one embodiment of the present invention in the brake retract position.
FIG. 4B illustrates one embodiment of the present invention in the brake apply position.

FIG. 4A illustrates one embodiment of the present invention at rest or after a brake retract is complete, and FIG. 4B illustrates the present invention during a brake apply. The arms 34 may have a angle ($\alpha$) between them at rest and a different angle ($\alpha'$) during a brake apply. As the brakes are applied and the angle between the arms changes the distance from the distal end 18 of the spreader spring to the farthest point of the body potion 32. The body portion 32 may increase in length from a length (L) to a new length (L'). Thus, for example, if the clip illustrated in FIG. 4A was placed in FIG. 2 the distal end would be close to the inside edge 22 of the support bracket and the clip illustrated in FIG. 4B would be close to the outside edge 24 of the support bracket. FIGS. 4A and 4B illustrate an angle $\gamma$ between the finger 40 and the arm 34.

Figure 5:
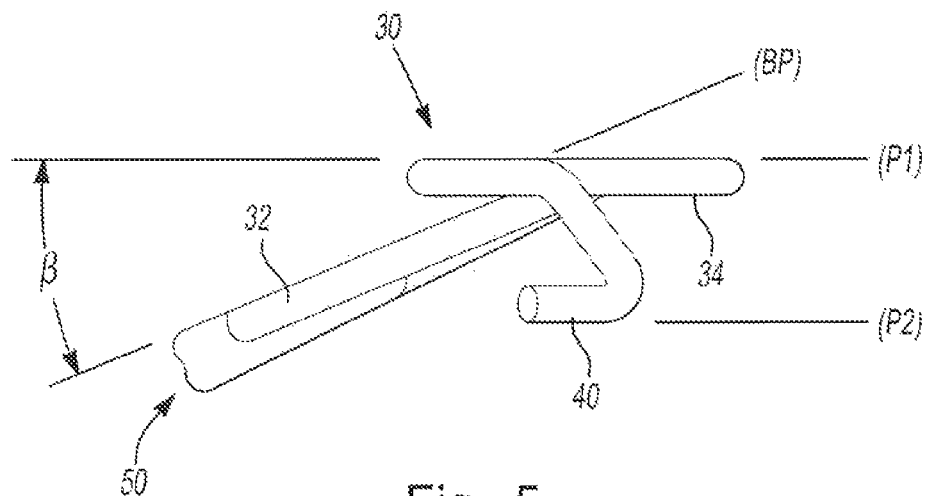
FIG. 5 illustrates another embodiment of the present invention.

FIG. 5 illustrates a side view of one embodiment of the present invention. The spreader spring 30 has a first plane (P1) and a second plane (P2). The portion of the arms 34 connected to the body portion 32 may form a first plane (P1) and the arms may extend away from the body portion and the arms 34 may include a finger 40 that form a second plane (P2). The body portion 32 may form a plane (BP) and the first plane (P1) may form an angle ($\beta$) relative to the plane (BP) of the body portion.

Figure 6:
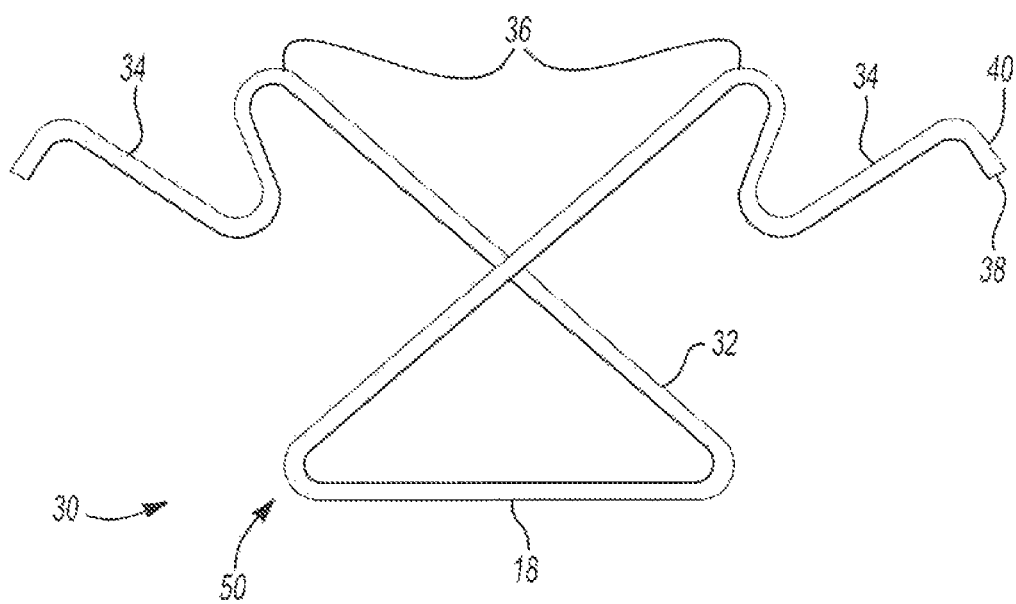
FIG. 6 illustrates another possible embodiment of the present invention.

FIG. 6 illustrates a top view of another possible configuration of the present invention. The spreader spring 30 includes a body portion 32, and the body portion further includes an energy storage portion 50 and a distal end 18. The spreader spring 30 includes arms 34 extending from the body portion 32. The arms include one or more arcuate portions 36, a contact portion 38, and fingers 40.

Figure 7:
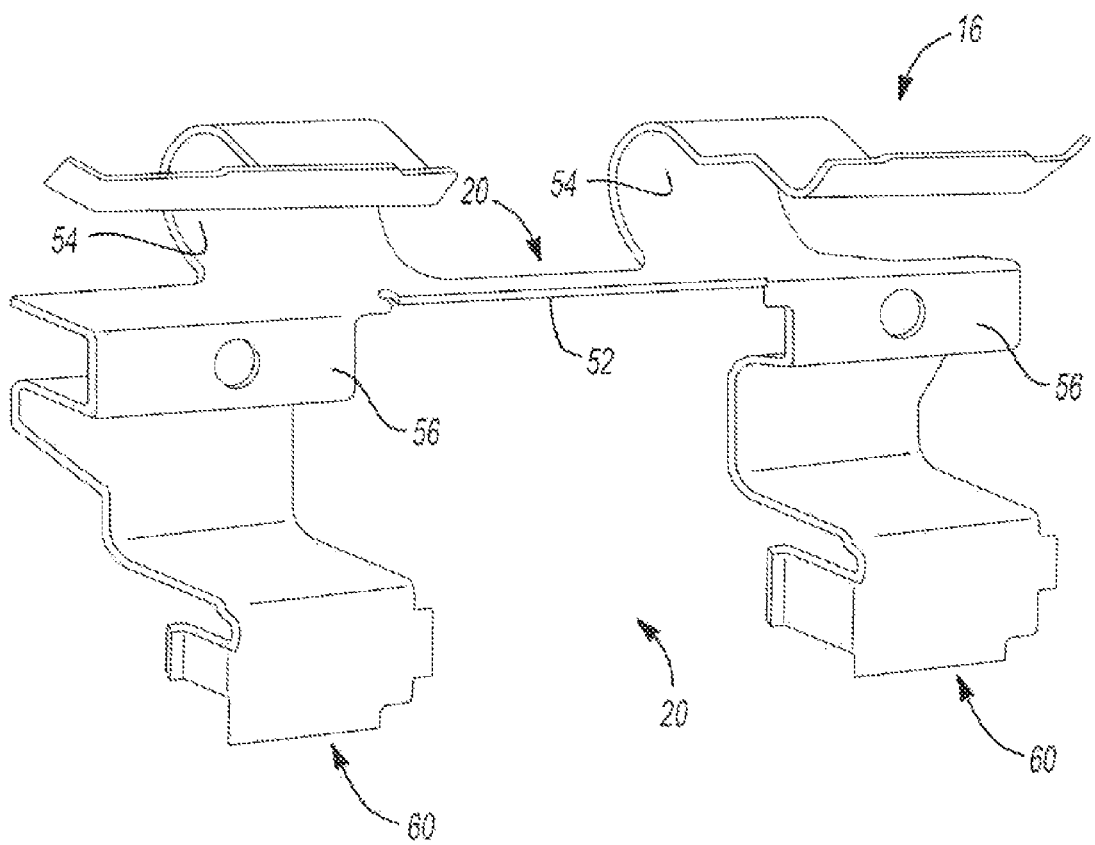
FIG. 7 illustrates one possible pad clip that may be used with the present invention.

FIG. 7 illustrates one possible pad clip 16 that may be used with the present invention. The pad clip 16 includes a bridge 52 and two recesses 54 formed above the bridge 52 and a protrusion 56 below each recess. The protrusion 56 extends to mirror the support bracket (see FIG. 2) so that the pad clip 16 is held in place. The pad clip includes legs 60 and a gap 20 over the bridge and the legs 60 and a gap 20 under the bridge. The gaps 20 are located in the center of the pad clip 16.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "x parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A brake assembly comprising:
   at least one brake spring that includes:
   a first arm;
   a second arm, the first arm and the second arm forming a first arm plane; and
   a body portion between the connecting to the first arm and the second arm, the body portion forming a body plane, the body plane being at an angle relative to the first arm plane;
   wherein the at least brake spring is between and in communication with a pressure plate of at least two brake pads, and
   wherein during a brake apply the brake spring is vertically displaceable relative to a support bracket of the brake assembly so that the brake spring is capable of moving vertically away from the support bracket and vertically towards the support bracket.

2. The brake assembly of claim 1, wherein the body portion includes an energy storage portion so that when a brake apply complete energy stored in the energy storage portion is used to move each of the at least two brake pads in a retract direction.

3. The brake assembly of claim 1, wherein the first arm and the second arm contact semi-pierced holes located in the pressure pates of the at least two brake pads, and
   wherein the first arm and the second arm each include a finger and the fingers form a second arm plane.

4. The brake assembly of claim 1, wherein the brake assembly includes a pad clip attached to a pad abutment of a support bracket, the pad clip having a gap extending therethrough so that a distal end of the brake spring extends through the gap in the pad clip to an opposing side of the pad clip.

5. The brake assembly of claim 4, wherein the first arm, the second arm, or both arms contact the pad clip during vertical displacement away from the support bracket so that displacement of the brake spring directionally away from the support bracket is minimized by the contact with the pad clip.

6. The brake assembly of claim 4, where the pad clip is free of a spring assembly support.

7. The brake assembly of claim 1, wherein the pressure plates of the at least two brake pads are free of drilled holes, and
   wherein the first arm and the second arm each include a finger and the fingers form a second arm plane.

8. The brake assembly of claim 1, further including at least two arcuate portions in the first and the second arm, the arcuate portions of the first arm and the second arm are substantially coplanar.

9. The brake assembly of claim 1, wherein motion of the brake spring in an axial direction, relative to a rotor, results from a force by a pressure plate or a release of energy from the brake spring independent of a pad clip or any other component.

10. The brake assembly of claim 1, wherein the body portion during vertical displacement moves vertically into contact with the support bracket so that displacement of the brake spring directionally towards the support bracket is minimized by the contact with the support bracket.

11. The brake assembly of claim 1, wherein the body portion, the first arm, the second arm, or a combination thereof remain substantially in-plane during a brake apply, a brake release, brake wear, or a combination thereof so that the body portion, the first arm, the second arm, or a combination thereof are free of contact with any of the components surrounding the brake assembly.

12. The brake assembly of claim 1, wherein a length of the body portion increases and the length increases substantially tangentially to an outside circumference of a rotor and away from a caliper body during a brake apply when the brake pads are new, the brake pads are fully worn, or a condition in-between.

13. The brake assembly of claim 1, wherein the brake spring includes a length during running and the length of the brake spring increases during a brake apply so that the brake spring moves in a direction substantially parallel to a support bracket of the brake assembly.

14. The brake assembly of claim 1, wherein the body portion of the brake spring includes a distal end and the distal end is substantially free of contact with both a pad clip and the support bracket so that the first arm and the second arm act dependently of each other.

15. A brake assembly kit comprising:
  a. at least one brake pad;
  b. at least one brake spring that includes:
    i. a first arm;
    ii. a second arm, the first arm and the second arm forming a first arm plane;
    iii. a body portion between and connected to the first arm and the second arm, the body portion forming a body plane, the body plane being at an angle relative to the first arm plane; and
    iv. an energy storage portion, wherein the energy storage portion is located between the first arm and the second arm;
  wherein an angle is formed between the body portion connected to the first arm and the body portion connected to the second arm, and the angle decreases during a brake apply so that a length of the least one brake spring increases;
  wherein the at least one brake spring is configured to be placed adjacent to the at least one brake pad forming an installed position so that the brake spring moves the brake pad, and
  wherein during a brake apply the brake spring is vertically displaceable relative to a support bracket so that the brake spring is capable of moving vertically away from the support bracket and vertically towards the support bracket.

16. The brake assembly kit of claim 15, further including at least one pad clip and the pad clip is configured to substantially surround at least a portion of the body portion connected to the first arm and the body portion connected to the second arm.

17. The brake assembly kit of claim 15, wherein the at least one brake pad is free of drilled holes.

18. The brake assembly kit of claim 15, wherein the kit includes at least one pad dip that attaches to a support bracket of the brake assembly and the body portion of the brake spring extends through a gap in the pad clip and away from a rotor of the brake assembly.

19. A method of reducing drag in a brake assembly comprising:
  a. compressing a brake spring; and
  b. placing the brake spring between ends of a pair of brake pads forming an installed position;
  wherein the brake spring includes:
    i. a first arm;
    ii. a second arm, the first arm and the second arm forming a first arm plane; and
    iii. a body portion between and connecting to the first arm and the second arm, the body portion forming a body plane, the body plane being at an angle relative to the first arm plane;
    iv. an energy storage portion, wherein the body portion connected to the first arm and the body portion connected to the second arm converge and connect to the energy storage portion;
  wherein an angle is formed between the body portion connected to the first arm and the body portion connected to the second arm, and the angle is decreased during the step of compressing so that the brake spring is placed between the pair of brake pads, and during the step of compressing a length of the at least one brake spring increases relative to a length of the brake spring in an uncompressed state;
  wherein contact points of the first arm and the second arm each contact a different brake pad and assist in moving the brake pads in a retract direction, and
  wherein during a brake apply the brake spring is vertically displaceable relative to a support bracket so that the brake spring is capable of moving vertically away from the support bracket and vertically towards the support bracket.

20. The method of reducing drag in a brake assembly of claim 19, wherein the method includes a step of connecting a pad clip to a pad abutment of the brake assembly, the pad clip including a gap that extends through the pad clip and;
  placing a distal end of the brake spring through the gap in the pad clip so that the distal end of the brake spring extends through the gap in the pad clip to an opposing side of the pad clip.

* * * * *

UNITED STATES PATENT AND TRADEMARK OFFICE
CERTIFICATE OF CORRECTION

PATENT NO. : 8,393,441 B2
APPLICATION NO. : 13/011971
DATED : March 12, 2013
INVENTOR(S) : Kenneth Eric Gutelius It is certified that error appears in the above-identified patent and that said Letters Patent is hereby corrected as shown below:

On the Title Page:

Item (56) References Cited under U.S. Patent Documents, Column 1, "5,251,727 A" should read:
--5,351,727--.

In the Claims:

Column 14, line 5, claim 2, "includes an energy storage portion so that when a brake apply" should read:
--includes an energy storage portion so that when a brake apply is--.

Column 14, line 32, claim 8, "two arcuate portions in the first and the second arm, the" should read:
--two arcuate portions in the first arm and the second arm, the--.

Column 15, line 36, claim 18, "includes at least one pad dip that attaches to a support bracket" should read:
--includes at least one pad clip that attaches to a support bracket--.

Signed and Sealed this
Third Day of September, 2013

Teresa Stanek Rea
*Acting Director of the United States Patent and Trademark Office*